United States Patent
Dowla et al.

(10) Patent No.: US 7,548,576 B2
(45) Date of Patent: Jun. 16, 2009

(54) SELF ORGANIZATION OF WIRELESS SENSOR NETWORKS USING ULTRA-WIDEBAND RADIOS

(75) Inventors: Farid U. Dowla, Castro Valley, CA (US); Franak Nekoogar, San Ramon, CA (US); Alex Spiridon, Palo Alto, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 657 days.

(21) Appl. No.: 11/165,867

(22) Filed: Jun. 24, 2005

(65) Prior Publication Data

US 2005/0286610 A1 Dec. 29, 2005

Related U.S. Application Data

(60) Provisional application No. 60/583,167, filed on Jun. 24, 2004.

(51) Int. Cl.
*H04B 1/69* (2006.01)
(52) U.S. Cl. .............. 375/130; 375/142; 375/147; 375/160; 375/152; 375/316; 375/340
(58) Field of Classification Search .......... 375/130, 375/340, 316, 152, 150, 147, 142
See application file for complete search history.

(56) References Cited

U.S. PATENT DOCUMENTS

| | | | |
|---|---|---|---|
| 5,995,566 A | 11/1999 | Rickard et al. | |
| 6,289,004 B1 | 9/2001 | Mesecher | |
| 6,717,992 B2 * | 4/2004 | Cowie et al. | 375/316 |
| 7,110,473 B2 * | 9/2006 | Miller et al. | 375/316 |
| 2001/0053175 A1 | 12/2001 | Hoctor et al. | |
| 2002/0064245 A1 | 5/2002 | McCorkle | |
| 2002/0106040 A1 | 8/2002 | Malkemes et al. | |
| 2002/0186764 A1 | 12/2002 | Amin et al. | |
| 2003/0108133 A1 * | 6/2003 | Richards | 375/351 |
| 2003/0198212 A1 | 10/2003 | Hoctor et al. | |

FOREIGN PATENT DOCUMENTS

JP 0701334 A2 3/1996

* cited by examiner

*Primary Examiner*—Chieh M Fan
*Assistant Examiner*—Siu M Lee
(74) *Attorney, Agent, or Firm*—Michael C. Staggs; John P. Wooldridge; John H. Lee

(57) ABSTRACT

A novel UWB communications method and system that provides self-organization for wireless sensor networks is introduced. The self-organization is in terms of scalability, power conservation, channel estimation, and node synchronization in wireless sensor networks. The UWB receiver in the present invention adds two new tasks to conventional TR receivers. The two additional units are SNR enhancing unit and timing acquisition and tracking unit.

14 Claims, 5 Drawing Sheets

US 7,548,576 B2

SELF ORGANIZATION OF WIRELESS SENSOR NETWORKS USING ULTRA-WIDEBAND RADIOS

RELATED APPLICATION

This application claims the benefits of U.S. Provisional Application No. 60/583,167, filed Jun. 24, 2004, and entitled, "Self Organization of Wireless Sensor Networks Using Ultra-Wideband Radios," which is incorporated herein by reference in its entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to wireless sensor networks that includes a multiplicity of individual sensor nodes and more particularly to a self-organization wireless receiver and method of utilizing such a receiver in an ultra-wideband (UWB) radio network.

2. Description of Related Art

Wireless sensor networks (WSNs) have become increasingly popular in military and civilian applications such as surveillance, monitoring, disaster recovery, home automation and many others. In a wireless sensor network, a large population of sensor nodes can be scattered in an inaccessible area to detect a physical phenomenon and process/transfer the information through wireless links to an expected destination. Due to the dense deployment of sensor nodes in such remote areas, the individual nodes are designed to have a small form factor, be light weight, provide long service with a limited energy source, and be inexpensive so they can be deployed in large numbers. The state of the art wireless sensor networks typically use conventional spread spectrum, or narrowband RF physical links. When WSN nodes are scattered in harsh RF environments, even the most advanced commercial off the shelf (COTS) radio faces significant problems at high data rate communications between the sensor nodes.

Unlike conventional RF communications, ultra-wideband transceivers use carrierless, short duration (pico second to nano second) pulses to transmit and receive information. The short duration of UWB pulses spreads their energy across a wide range of frequencies from near DC to several Gigahertz. Such a large bandwidth provides high capacity and low probability of detection properties for UWB communication systems. Using UWB technology for inter-node communication of WSNs not only offers small form factors but also provides high performance for communication over the wireless channels in spite of multipath distortions.

Furthermore, transmission of short duration UWB pulses requires much lower power compared to strong narrowband signal transmission. In UWB-based WSNs, nodes can only communicate with their close-by neighbors due to low transmission power and avoid the inter-node interference issue that exists in narrowband techniques. Despite all the benefits that UWB technology offers to the design of WSNs, it can also create a unique set of challenges. Employing the low powered UWB pulses for inter-node communications introduces the scalability problem in WSNs. As the distance between nodes or the number of nodes increases, weak UWB pulses cannot transfer the information between the nodes properly. In addition, the short duration of UWB pulses introduces a major challenge in time synchronization for sensor nodes in a wireless network. In order to synchronize sub-nanosecond pulses, very high-speed ADC components are needed.

Another problem with using UWB technology for wireless sensor networks is the performance degradation due to interference from strong narrowband signals that share the spectrum with low powered UWB pulses. Moreover, detection of UWB pulses is commonly performed using classical matched filtering technique. Therefore, where the received signal is correlated with a UWB pulse template, wireless channel effects (such as multipath) on the received signal can significantly degrade the detection process due to low correlation between the predefined template and the distorted received signal.

The main design challenges in WSNs can be categorized into the following areas:

Scalability: As the number of sensor nodes in a wireless network increases, scalability imposes difficulties in transferring data. In order to send information to far away nodes, signals with higher transmission power is typically employed, which can cause inter-node interference or a multi-hop approach needs to be considered.

Power conservation: The nodes in wireless sensor networks have limited energy resources, so to extend the lifetime of the entire network, power conservation in individual nodes is of significant importance. In WSNs, radio communications is the major consumer of energy. Hence, minimizing the radio transmission power or avoiding the unnecessary communications can considerably save power in sensor nodes.

Synchronization: In radio communications between sensor nodes of a WSN, sensors continuously listen to transmissions and consume power if they are not time synchronized with each other. While global synchronization is unrealistic due to the large sensor population, node-by-node synchronization becomes a necessity in WSN design.

Channel estimation: Channel estimation plays a critical role in WSNs, since sensor nodes communicate over wireless channels and have to overcome the effects of wireless link, such as noise, multipath effect, intentional jamming and inter-node interference. Estimating the wireless link between a specific transmitter and receiver pair provides directionality and reliable data transfer between the nodes.

Accordingly, a need exists for a UWB approach that facilitates self-organization of individual nodes with respect to power efficiency, scalability, channel estimation, and node synchronization in WSNs. The present invention is directed to such a need.

SUMMARY OF THE INVENTION

The present invention is directed to a self organizing wireless sensor network (WSN) receiver that utilizes ultra-wideband (UWB) technology that is capable of inter-node communications within a sensor network.

Another aspect of the present invention is directed to an ultra-wideband (UWB) sensor network method that includes: transmitting from one or more nodal positions, a plurality of UWB pulse pairs; continuously receiving within a predetermined sensor field the plurality of UWB pulse pairs, each of the transmitted pulse pairs separated by a predetermined lag interval D, wherein each of the pulse pairs comprise a predetermined encoded data, a reference signal, and are arranged to be received at a predetermined symbol repetition period;

feedback looping one or more times, a predetermined portion of the pulse pairs, wherein the pulse pairs are shifted by the symbol repetition period with each iteration through a feedback loop; delaying the encoded data of the received pulse pairs by the lag interval D; multiplying a plurality of reference signals produced by the looped pulse pairs with delayed versions of encoded data; threshold tracking the multiplied plurality of reference signals and the delayed versions of encoded data; setting an integration window as determined by the threshold tracking; integrating within the set integration window the plurality of reference signals produced by the looped pulse pairs with the one or more delayed versions of encoded data included in the delayed one or more pulse pairs to generate a total energy that decodes the plurality of pulse pairs; and outputting bit information indicative of encoded information of the received pulse pairs.

Accordingly, the present system and method provides a desired UWB based approach for inter-node communications of wireless sensor networks. Such a system is self-organized with respect to network power conservation, channel estimation, scalability, and node synchronization. Applications include, but are not limited to, habitat monitoring, environment observation, health monitoring, home automation, smart home/office environments and are ideal for covert communication with sensor nodes in a wireless network for military applications, such as, wireless sensor networks in a tactical battle field.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1A:
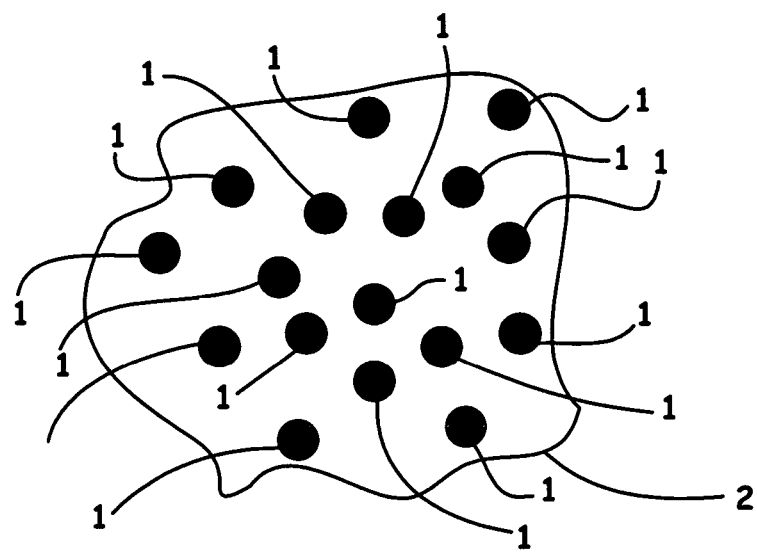
FIG. 1(a) is a general illustration of a wireless sensor network.

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

The present invention provides an ultra wideband (UWB) self organization technique and receiver capable of being arranged on a system for inter-node radio communication in wireless sensor networks. Turning now to the drawings, FIG. 1(a) shows a basic representation of such a wireless sensor network, which generally includes a multiplicity of sensor nodes 1 that that are often arranged as (UWB) communication interfaces in a sensor field 2.

In UWB communication systems, as discussed briefly above, pulses are often transmitted as a sequence of impulses, often in pairs of pulses, (doublets) arranged as symbols, i.e., a pair of UWB pulses (unique to each user) called a reference ("Ref") pulse and "Data" pulse separated by a unique delay for each user. The UWB pulses can be of any form of wideband pulses such as, for example, chirp pulses, hermite pulses, gaussian pulses, etc. FIG. 1(b) shows such a method having a first pulse 14 within each doublet 11, 12, called transmit, "Tr", which can be polarity modulated by the incoming digital data. A second pulse 16 in each doublet 11, 12 called a reference, "Rf" is often un-modulated. A delay 18, denoted by the letter D, between the pulses in doublet 11, 12 is known to a predetermined receiver (not shown) and is unique to each user in multiple access channels. A time separation 22, denoted by the letter T, between doublets 11, 12, is the symbol repetition period (SRP) and is known to a SNR enhancing unit in a predetermined receiver.

Figure 1B:
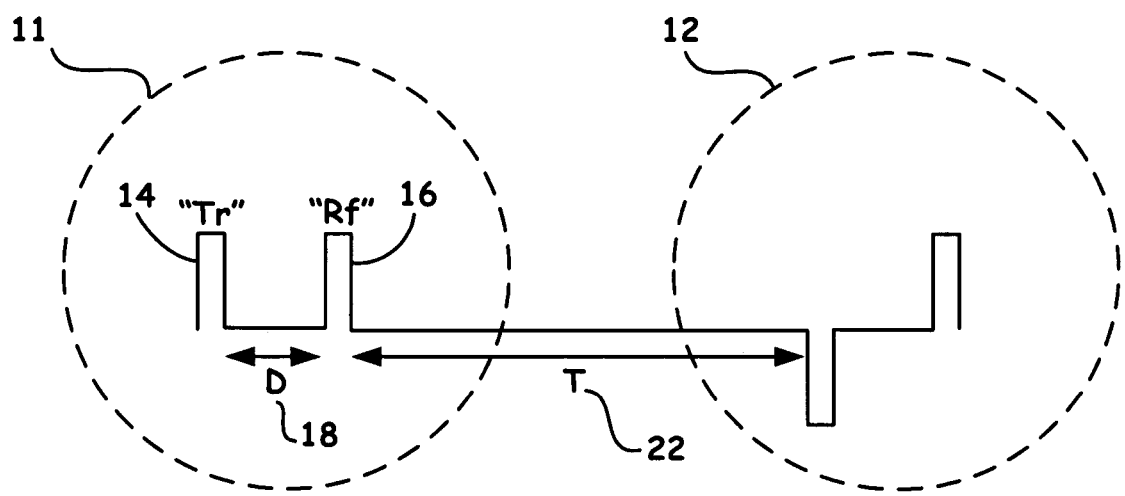
FIG. 1(b) illustrates two TR doublets with "Rf" and "Tr" pulses in each doublet, delay between the pulses in a doublet, D, and time separation between the doublets, T.

An exemplary UWB receiver of the present invention thus includes a signal-to-noise-ratio (SNR) enhancing unit to locally enhance a received signals' SNR having such transmitted symbols from one or more nodes 1 in a predetermined sensor field 2, as shown in FIG. 1(a), and an Acquisition and Tracking unit to provide rapid synchronization for radio communications between such nodes.

In particular, the front end of a modified UWB-TR receiver of the present invention includes the SNR enhancing unit, which is arranged to suppress interference for reference pulses in a TR receiver by introducing a feedback loop with a delay equal to a symbol repetition period (T) as applied to a conventional TR receiver. Details of the methods and architecture for such a feedback loop utilized in combination with other aspects of the present invention is disclosed in Co-pending, U.S. application Ser. No. 10/815,450, titled "UWB Communication Receiver Feedback Loop," by A. Spiridon, D. Benzel, F. Dowla, F. Nekoogar, E. Rosenbury, the disclosure of which is herein incorporated by reference in its entirety. Utilizing the feedback loop mechanism in the SNR enhancing unit limits unnecessary listening in individual sensor nodes and provides power saving advantages to each sensor node and consequently to the entire network, thereby providing network power conservation.

Using such a feedback loop, the backend detection part of the receiver that includes the acquisition and tracking unit can be shut down while leaving the front-end SNR enhancing unit activated. The feedback loop mechanism is thus arranged to continuously improve the SNR of a received signal until the received signals' interference is suppressed. Once the received signal reaches a specific threshold and is strong enough for reliable communications, the TR receivers can be activated and detect the received bits. Such a form of self-organization provides, as stated above, considerable power saving for individual nodes as well as the entire circuit. Specifically, since the feedback loop is a passive circuit and can run continuously in each sensor while using minimal amount of power, every node whose received signal has reached an assigned threshold is locally self-organized to activate its receiver.

The ability to locally enhance the received signal's SNR, directly improves the communications range. The enhanced range for sensor nodes as provided by the present invention, prevents neighboring nodes from expiring due to lack of power and prevents the inclusion of information bearing nodes to establish communications link with other nodes in a longer distance away from their normal communications range. This aspect of the present invention provides scalability for wireless sensor networks by establishing communications links with various nodes at various distances.

The acquisition and tracking unit of the present invention, discussed in detail hereinafter, resides after the SNR enhancing unit and provides the synchronization and integration window estimation throughout the duration of the transmission. The present invention thus combines a feedback loop with an acquisition and tracking unit to conventional TR receivers to provide self-organization in terms of power conservation, scalability, channel estimation, and node synchronization for wireless sensor networks.

Specific Description

Figure 2A:
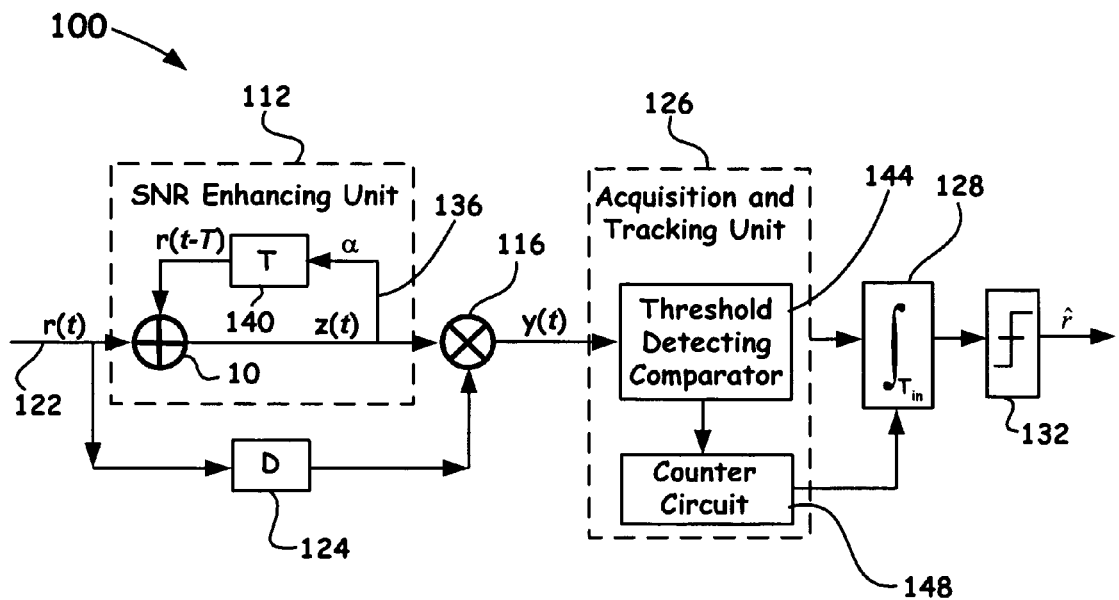
FIG. 2(a) shows the details of a modified TR receiver for inter-node radio communications.

Turning back to the drawings, FIG. 2(a) shows an example beneficial receiver block diagram embodiment of the present invention, generally designated as reference numeral 100, which is capable of actively enhancing the SNR in "Rf" pulses in a received signal r(t) and accurately estimating the exact position of a desired integration window.

Details of FIG. 2(a) include a front-end SNR enhancing unit 112 (shown within a dashed rectangle) arranged to receive signal r(t) by integrating such a unit to a conventional TR receiver structure. As shown in FIG. 2(a), a portion of received signal r(t) is split off of a common input line 122 and directed to a delay 124, denoted by D, which delays incoming pulse pairs (as shown in FIG. 1(b)) to enable the overlapping of "Rf", i.e., reference pulses, captured in SNR enhancing unit 112 and "Tr" pulses encoded with data. Subsequently, their product as produced by multiplier 116 and integrated by a finite integrator 128 after passing through a back-end acquisition and tracking unit 126, decodes the pulse pair by capturing the total energy and feeding through a decision making block 132.

SNR enhancing unit 112, as disclosed in incorporated by reference U.S. application Ser. No. 10/815,450 and as shown in FIG. 2(a), includes an upper arm signal 136 that is directed through a feedback loop delay 140, designed with an averaging delay (denoted by the letter T), wherein upper arm signal 136 can be circulated in feedback delay loop 140 a desired number of iterations and back to an adder 10 instead of feeding directly through to the input of multiplier 116.

It is to be appreciated that feedback loop 140 in SNR enhancing unit 112 is often designed to have an averaging delay (T) equal to a symbol repetition period (SRP), and a feedback loop loss/gain factor (denoted as $\alpha$) having a reduction factor of less than 1. It is beneficial that the gain $\alpha$ within feedback loop delay 140 implements a gain of less than one to introduce a loss factor for processing gain of the combined noise and signal associated with loop iterations. Such adjustment of the gain results in noise signals circulating in the loop along with the desired signals to incur an increment of loss. Such a loss is often adjusted to the maximum value while assuring loop stability. The lower the loop loss the longer the loop retains a pulse, hence the larger number of pulses that are averaged. The overlapping of the "Rf" occurs when loop delay T is set to the symbol repetition period (SRP). Since the polarity of "Rf" pulses is always the same, the overlap in each loop iteration makes such pulses gain in amplitude while data pulses "Tr" do not experience the same resonance because of having opposite polarity depending on the transmitted data.

Assuming that interference caused by AWGN is uncorrelated with a desired signal, each circulation of input signal through feedback loop makes "Rf" pulses cleaner, i.e., a greater signal to noise ratio, by rejecting the interference. However, in order to have a successful narrowband interference rejection, the feedback loop delay, T, is designed to not be equal to integer multiples of interfering narrowband signal period to avoid resonating the narrow band interference (NBI). Once the SNR is enhanced, a strong signal, (shown as z(t) in FIG. 2(a)), can be multiplied with a delayed version of the original received signal, r(t) as:

$$y(t)=r(t-D)\cdot z(t)$$

At this point the acquisition and tracking unit estimates the start and end of the integration window, $T_{in}$, for each received bit prior to finite integration operation. Therefore, the received data bit can be decoded as:

$$\hat{r}=sgn(\int_{Tin} r(t-D)\cdot z(t)dt)$$

Figure 2B:
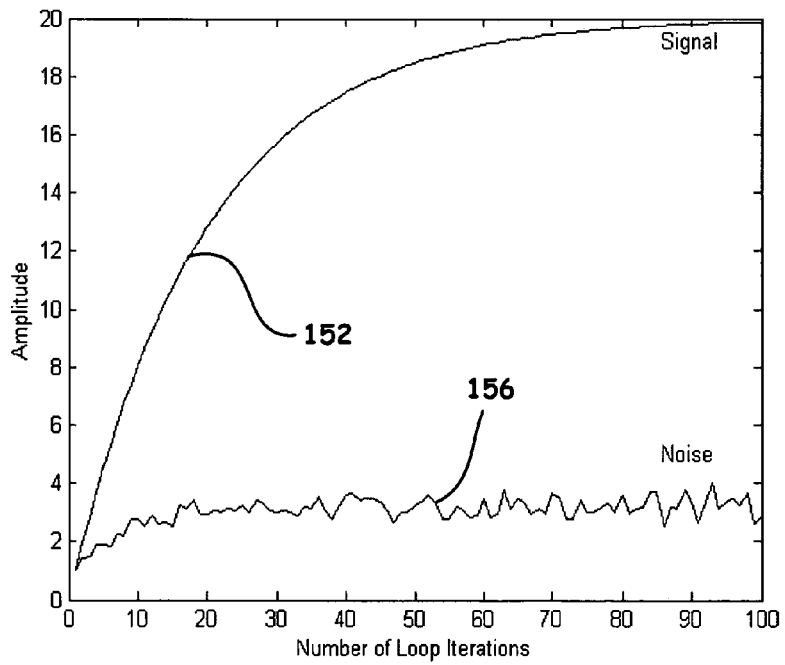
FIG. 2(b) illustrates the signal and noise progression at the output of a signal-to-noise ratio (SNR) enhancing unit.

FIG. 2(b) illustrates graphically, a signal 152 and a noise 156 progression at the output of the SNR enhancing unit 112 based on number of feedback loop iterations. As shown in FIG. 2(b) after only about 10 to 20 iterations, signal's amplitude 152 is completely separated from noise amplitude 156. Accordingly, the signal-to-interference ratio of signal 152 increases significantly as the number of loop iterations increases. Such a method is beneficial for signals corrupted by AWGN channels, since different samples of white noise are uncorrelated, although the feedback loop filter often can introduce some correlation. Furthermore, to avoid resonating the NBI, a successful narrowband interference rejection requires that averaging delay T, as shown in FIG. 2(a), cannot be equal to integer multiples of interfering narrowband signal periods.

Again referring to FIG. 2(a), acquisition and tracking unit 126, which resides in the back end section of receiver 100, i.e., after the SNR enhancing unit 112, includes two major blocks; a threshold detecting comparator 144, and a counter circuit 148. The initial acquisition of an integration window is performed by a comparator device (not specifically shown) that is programmed to detect various values of signal SNR in dB, wherein the integration window defines the limits of finite integrator 128 prior to being directed to final decision making block 132, wherein data can be processed and output as bit information indicative of encoded information of received pulse pairs.

It is to be appreciated that any deviation from the exact position of such a window results in performance degradation of the UWB receiver. By obtaining the first position of the integration window, the initial acquisition takes place and results in partial synchronization of the receiver. Since the data symbols, as illustrated in FIG. 1(b), are separated by a fixed interval, T, the fine synchronization or tracking operation starts by searching for the specified threshold every T units in time. Such a process maintains the synchronization and integration window estimation throughout the duration of the transmission. The initial acquisition of the integration window involves some search for the first signal with a SNR of larger than the specified threshold. However, such a search ends quickly after 15 or 20 loop iterations that correspond to the loss of 15 to 20 initial received bits. The reason is that the feedback loop mechanism in the SNR enhancing unit improves the signal amplitude rapidly and results in a fast initial acquisition Therefore, this method turns out to be much faster than the exhaustive search algorithms that are conventionally used for pulse synchronization.

As stated above, threshold detecting comparator 144, arranged within acquisition and tracking unit 126, is designed to continuously check an output signal (denoted as y(t)), from multiplier 116 for passing an assigned threshold. Specifically, the initial acquisition of the integration window of the present invention programmed by the comparator device (not specifically shown) to detect various values of SNR in dB units is given by:

$$x(t_i) = |y(t)| > \gamma$$

where $\gamma$ denotes the assigned threshold limit, y(t) is a vector of the input signal to the acquisition and tracking unit and $x(t_i)$ denotes the first occurrence of y(t) that has passed the threshold limit. Once the first "Rf" pulse from received signal r(t) passes the assigned threshold, its timing can be recorded as $T_1$ and $T_2$ for the location of the first integration window. Therefore, $t_i$ represents the time index of the first pulse passing the threshold limit, with:

$$T_1 = t_i$$

$$T_2 = T_1 + T_p$$

where $T_p$ represents the duration of pulse energy which is approximately equal to pulse width in line-of site (LOS) channels. By obtaining the first position of the integration window, the initial acquisition takes place and results in partial synchronization of the receiver. Since the data symbols are separated by a fixed interval, T, the fine synchronization or tracking operation starts by searching for the specified threshold every T units in time. As stated above, but now with emphasis, such a process maintains the synchronization and integration window estimation throughout the duration of the transmission.

Figure 3A:
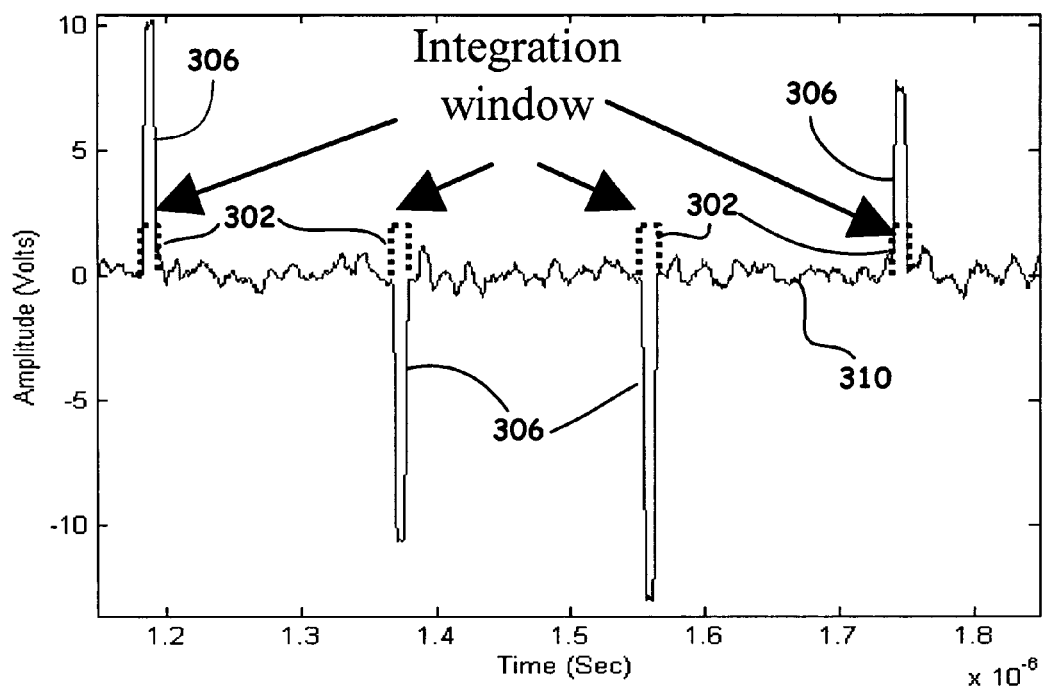
FIG. 3(a) Shows a representation of an integration window in the received signal in a noisy line-of-site channel.
Figure 3B:
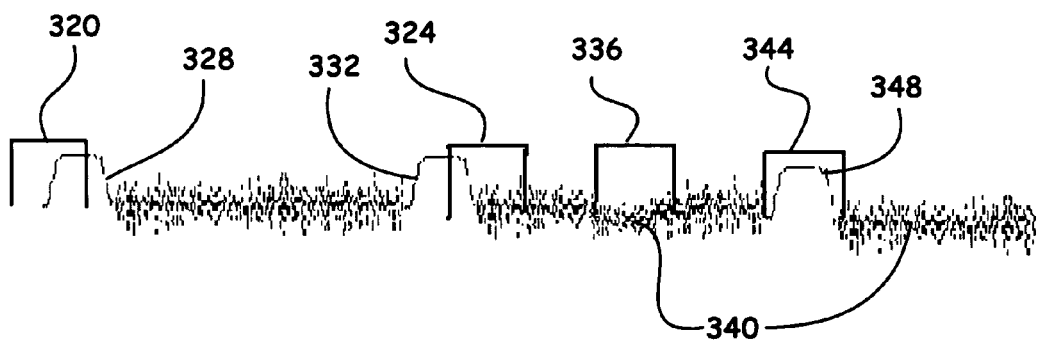
FIG. 3(b) Demonstrates an example of a UWB signal and variations of the integration window's position in TR receivers.

FIG. 3(a) illustrate performed integration windows 302 on example UWB received signals 306 in a noisy line of site channel 310. FIG. 3(b) illustrates variations of the length of an integration window's position capable of being produced by the receiver in present invention. Any deviation from the precise position of the integration window causes a decrease in SNR of the received signal and results in false alarm and severe performance degradation of the receiver.

As shown in FIG. 3(b), a receiver of the present invention can suffer from significant performance degradation due to improper position of such a deviated window. As illustrated, a first and a second integration window from the left, 320 and 324 only capture parts of a signal energy 328 and 332. A third integration window 336 just captures noise 340 with no signal content and a last window 344 shown to the far right is the only one that captures an entire signal energy 348 due to its precise position.

Figure 4:
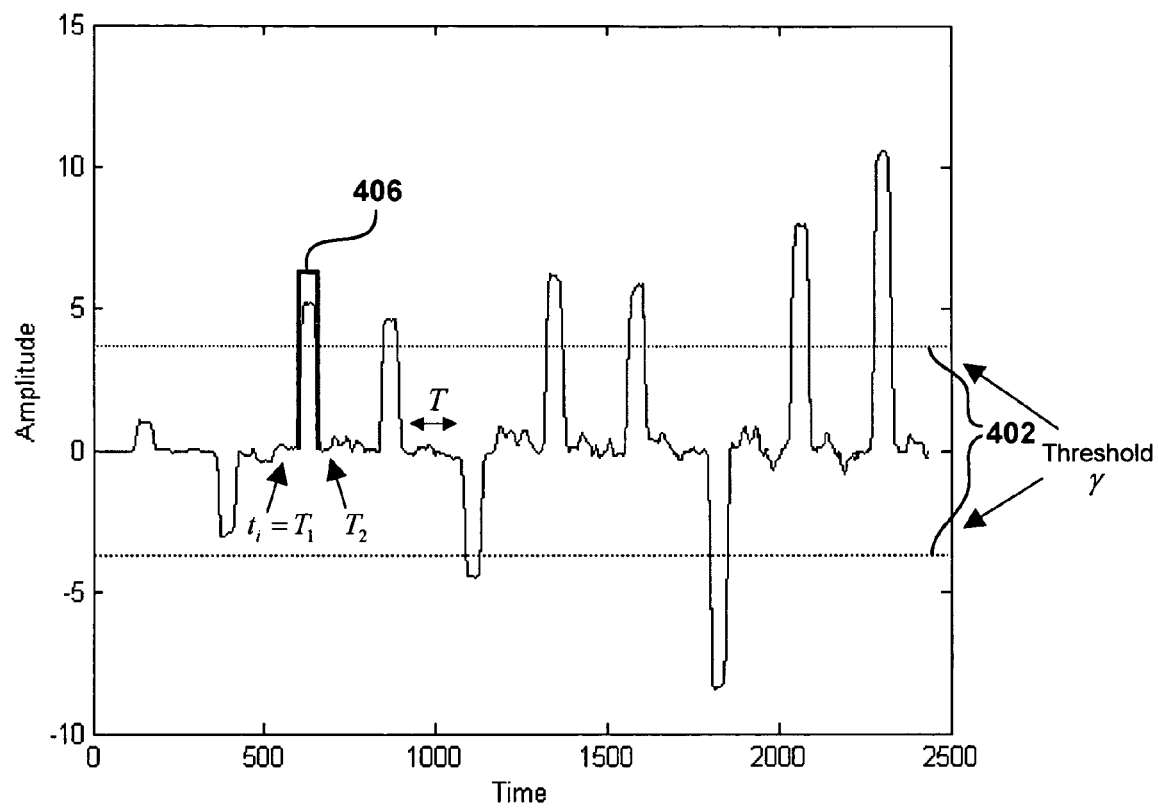
FIG. 4 Shows an example of pulses passing through the threshold comparator and initial acquisition of the integration window.

FIG. 4 illustrates an example of pulses passing a designed threshold level 402 inside the threshold comparator 144, as shown in FIG. 2(a). As shown in FIG. 4., an initial acquisition of an integration window 406 begins at a lower limit (shown as $t_i = T_1$) as determined by the desired threshold and ends at an upper designed limit (shown as $T_2$).

Figure 5A:
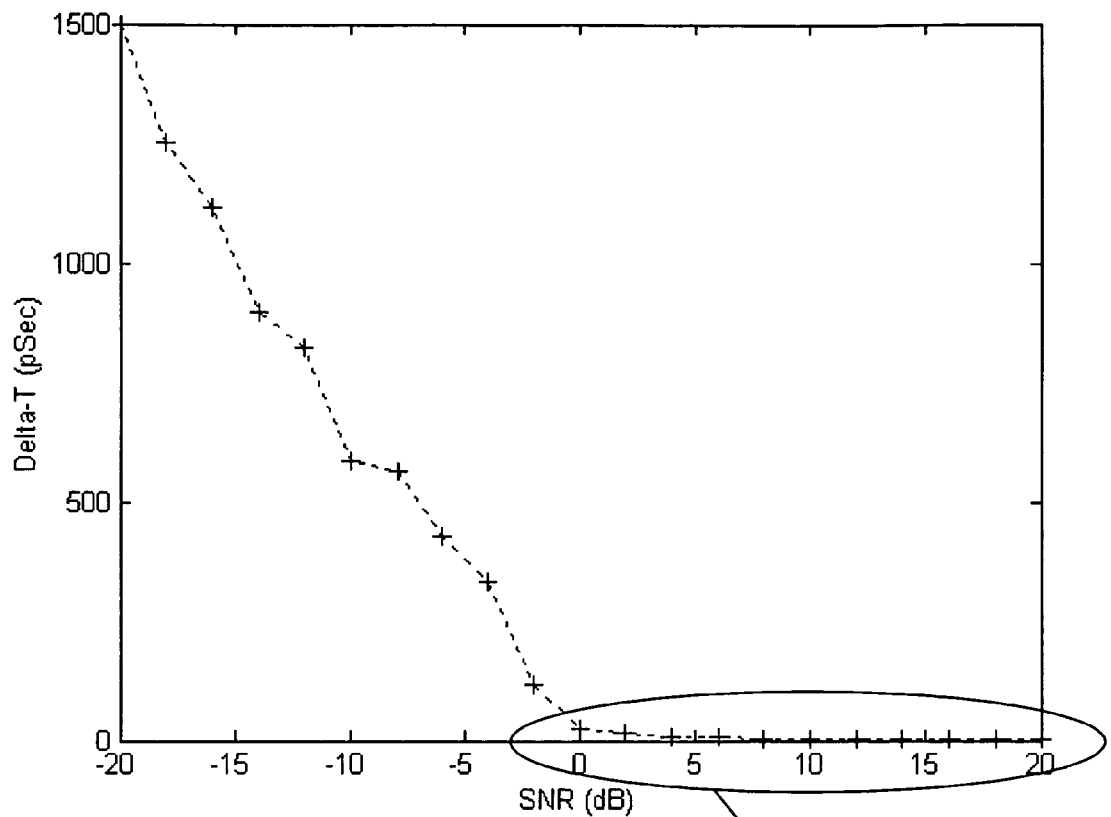
FIG. 5(a) Demonstrates how timing acquisition of a signal is improved as SNR increases.
Figure 5B:
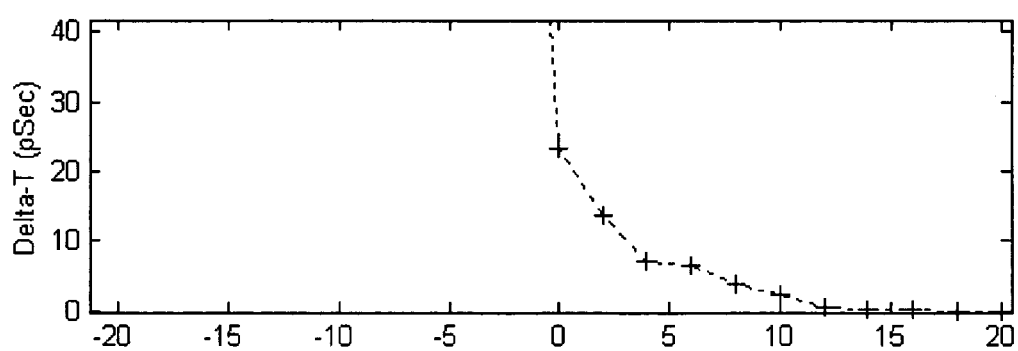
FIG. 5(b) Shows an expanded view of the detection time uncertainty after the SNR is increased from 0 dB to higher values.

FIG. 5(a) shows a plot of time uncertainty versus the SNR of UWB data of the present invention and illustrates graphically that the time uncertainty of the received UWB data 502 is reduced as SNR improves. Specifically, FIG. 5(a) shows that the time uncertainty in detection of a single pulse decreases from about 1500 ps to about 20 ps as the SNR is improved from −20 dB to 0 dB. FIG. 5(b) shows an expanded view (shown within the ellipse of FIG. 5(a)) of the detection time uncertainty after the SNR is increased from 0 dB to higher values. Accordingly, the time uncertainty is greatly reduced to about zero at high SNRs. Therefore, the SNR enhancing unit of the present invention plays an important role in providing accuracy in pulse detection in the presence of timing jitter.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A self-organizing ultra-wideband (UWB) receiver, comprising:
    a feedback amplifier having an input line and an output line, said input line electrically coupled to a common input line, wherein said feedback amplifier, said input line and said output line are configured as a feedback loop so as to electronically loop at least once, one or more transmitted pulse pairs received on said common input line, wherein said transmitted pulse pairs have a predetermined encoded data and a predetermined symbol repetition period;
    at least one delay electrically coupled to said common input line and configured to reproduce a predetermined lag interval D of said one or more transmitted pulse pairs;
    a signal multiplier electrically coupled to said at least one delay and said output line of said feedback loop for multiplying delayed versions having said lag interval D of said transmitted pulse pairs and one or more of said electronically looped transmitted pulse pairs;
    a timing acquisition and tracking unit configured to determine a predetermined threshold value produced by said signal multiplier; and
    an integrator configured to integrate a product signal output by said timing acquisition and tracking unit, wherein an integrator output is electronically analyzed to determine an output signal that is indicative of said predetermined encoded data.

2. The receiver of claim 1, wherein said timing and acquisition unit further comprises a threshold detecting comparator and a counter circuit.

3. The receiver of claim 2, wherein said threshold detecting comparator and said counter circuit checks for a predetermined threshold value every said predetermined symbol repetition period.

4. The receiver of claim 3, wherein said predetermined threshold value is determined in less than about 20 feedback loop iterations.

5. The receiver of claim 1, wherein a gain of said feedback loop is less than 1.

6. The receiver of claim 1, wherein said feedback loop averages out interfering narrowband signals and white noise by adjusting a feedback loop travel time delay to substantially match said predetermined symbol repetition period of said received pulse pairs.

7. The receiver of claim 1, wherein said encoded data includes a relative polarity of a received transmitted data pulse with respect to a received transmitted reference pulse.

8. The receiver of claim 1, wherein a plurality of said receivers can be arranged as nodes in a network sensor field.

9. An ultra wideband (UWB) sensor network method, comprising:

> transmitting from one or more nodal positions, a plurality of UWB pulse pairs;
>
> continuously receiving within a predetermined sensor field, said plurality of UWB pulse pairs, each of said transmitted pulse pairs separated by a predetermined lag interval D, wherein each of said pulse pairs comprise a predetermined encoded data, a reference signal, and are arranged to be received at a predetermined symbol repetition period;
>
> feedback looping one or more times, a predetermined portion of said pulse pairs, wherein said pulse pairs are shifted by said symbol repetition period with each iteration through a feedback loop;
>
> delaying said encoded data of said received pulse pairs by said lag interval D;
>
> multiplying a plurality of reference signals produced by said looped pulse pairs with delayed versions of encoded data;
>
> threshold tracking said multiplied plurality of reference signals and said delayed versions of encoded data;
>
> setting an integration window as determined by said threshold tracking;
>
> integrating within said set integration window said plurality of reference signals produced by said looped pulse pairs with said delayed versions of encoded data to generate a total energy that decodes said plurality of pulse pairs; and
>
> outputting bit information indicative of encoded information of said received pulse pairs.

10. The method of claim 9, wherein said threshold detecting step further comprises checking for a predetermined threshold value every said predetermined symbol repetition period.

11. The method of claim 10, wherein said predetermined threshold value is determined in less than about 20 loop iterations.

12. The method of claim 9, wherein a gain of said feedback loop is less than 1.

13. The method of claim 9, wherein said feedback loop averages out interfering narrowband signals and white noise by adjusting a feedback loop travel time to substantially match said predetermined symbol repetition period of said received pulse pairs.

14. The method of claim 9, wherein said encoded data includes a relative polarity of a received transmitted data pulse with respect to a received transmitted reference pulse.

* * * * *